Oct. 6, 1970    S. H. BREITKOPF    3,532,285
ROLL CORE SUPPORTING DEVICE
Filed Jan. 3, 1969
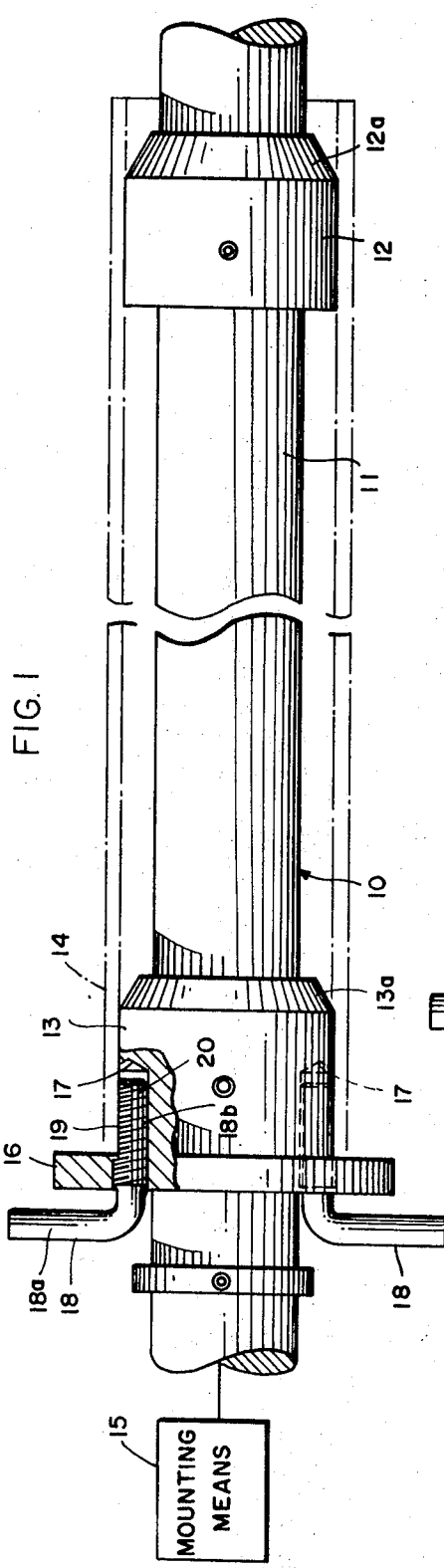
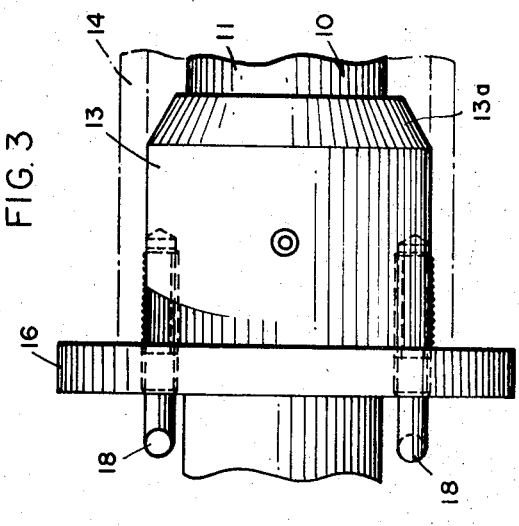
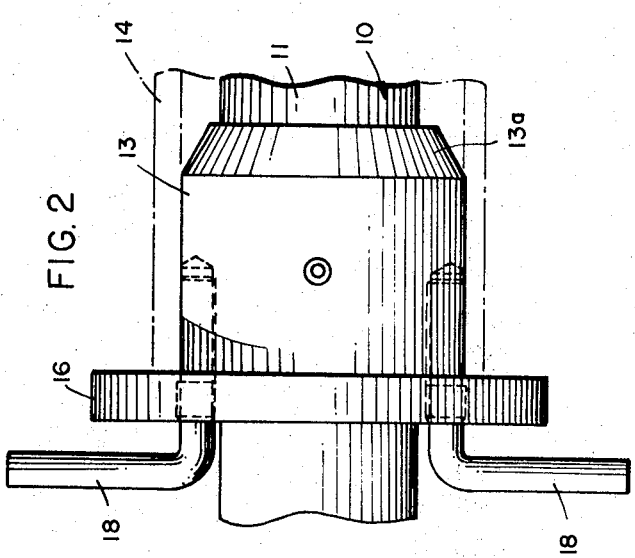
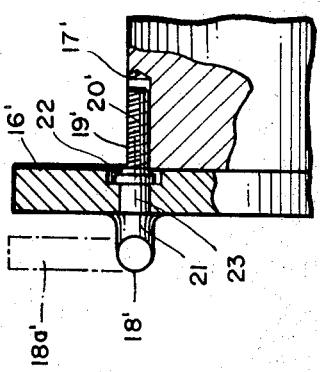
INVENTOR:
STEPHEN H. BREITKOPF
BY
Dawson, Tilton, Falloy & Lungmus
ATT'YS United States Patent Office 3,532,285
Patented Oct. 6, 1970

3,532,285
ROLL CORE SUPPORTING DEVICE
Stephen H. Breitkopf, North Brunswick, N.J., assignor to American Hospital Supply Corporation, Evanston, Ill., a corporation of Illinois
Filed Jan. 3, 1969, Ser. No. 788,826
Int. Cl. B65h 17/02
U.S. Cl. 242—68.1                                                    11 Claims

ABSTRACT OF THE DISCLOSURE

A hub as part of a spindle assembly for use in supporting rolls of paper, cloth, plastic, and other sheet materials wound upon tubular cores. The hub is expandable upon rotation of one or more locking members provided thereby to engage securely the inside surface of a roll core fitted thereon. Rotation of each locking member in an opposite direction releases the roll core for removal and replacement.

BACKGROUND

As is well known, paper, cloth and other sheet materials are commonly available in bulk form in large rolls which may be fitted upon spindles to facilitate the unwinding and removal of the materials. Since braking or driving forces must sometimes be applied to such rolls during the unwinding (or rewinding) operations, some mechanism is usually provided for locking the resilient core of the roll against independent relative rotation with respect to the spindle upon which it is mounted. However, in the past such locking mechanisms have been relatively complex in structure and operation and, at least in some cases, have tended to be unreliable in holding cores securely upon their spindles or in releasing such cores when removal and replacement is desired. The improved roll core supporting device of the present invention is therefore directed at overcoming the defects and disadvantages of such prior constructions.

SUMMARY

The device of this invention consists essentially of a generally cylindrical hub having an external diameter slightly smaller than the internal diameter of a tubular roll core to be mounted thereon. The hub is part of a spindle assembly which is equipped with at least one additional hub, the spindle in turn being carried by suitable mounting means which may include a motor for rotating the spindle or braking means for controlling its rate of rotation.

The hub has at least one bore parallel with the hub's axis, the bore having its own axis spaced from the cylindrical periphery of the hub a distance less than the radius of the bore. Consequently, the length of the bore, or a substantial portion thereof, is exposed along the surface of the hub. A locking member is rotatably mounted in the bore, the locking member being generally cylindrical in shape but having a flattened side surface which is flush with the outer surface of the hub when the locking member is rotated into a releasing position. Upon rotation of the locking member into a locking position, the generally cylindrical side surface of the member protrudes from the bore to bear forceably against the inside surface of a roll core mounted upon the hub. The locking member is provided with locking ribs which, in a preferred form of the invention, take the form of threads which bite into the inside surface of the resilient core to lock it in place.

Other objects and advantages of the invention will be readily apparent from the following description and drawings.

DRAWINGS

FIG. 1 is a side elevational view of a spindle equipped with a hub and locking means embodying the present invention, the hub being shown partly in section and the spindle mounting means being illustrated schematically;

FIG. 2 is a slightly enlarged elevational view showing the hub with the locking members in releasing position;

FIG. 3 is an elevational view similar to FIG. 2 but showing the members in locking position;

FIG. 4 is a sectional view illustrating a modified hub and locking member.

DESCRIPTION

Referring to the drawings, the numeral 10 designates a spindle assembly which comprises a shaft 11, a guiding hub 12, and a locking hub 13. A stock roll core indicated by broken lines 14 may be slipped over the hubs as indicated in FIG. 1. Such a tubular core is formed of resilient or deformable material, normally cardboard or pressed fibrous material, and supports a roll of paper, cloth, plastic, foil, or other sheet material (not shown).

The spindle is supported by any suitable mounting means diagrammatically illustrated in FIG. 1 and designated by the numeral 15. The mounting means will necessarily include a supporting frame and bearings for the spindle and may also include a motor, brake, and other means for controlling rotation of that spindle. Since such means are conventional and well known, a more detailed description is believed unnecessary herein.

Hubs 12 and 13 are spaced axially along shaft 11 and are pinned, keyed, welded, or otherwise securely mounted thereon. Each hub is generally cylindrical in configuration and has one beveled face 12a and 13a to facilitate loading a stock roll core upon the spindle.

Locking hub 13 is provided with a flange 16 which is larger than the outside diameter of core 14 and which serves as an end stop to assist in precise positioning of a core upon the spindle. In the illustration given, the locking hub is also provided with a pair of diametrically disposed and longitudinally extending bores 17 which project forwardly through flange 16 into the cylindrical body of the hub. It will be noted that the axis of each bore is spaced inwardly from the periphery of the hub bory a distance less than the bore's radius, with the result that each bore is longitudinally exposed along the outer surface of the hub.

Rotatably mounted in each bore 17 is a locking member 18. In the embodiment illustrated in the drawings, each locking member comprises an L-shaped bar having a handle portion 18a and a threaded portion 18b, the latter portion being rotatably received in bore 17. The cylindrical portion 18b is ground away to provide a flattened surface 19 which is substantially flush with the outer surface of the body when the member is in the releasing position illustrated in FIGS. 1 and 2.

The generally cylindrical surface of the locking portion 18b is provided with ribs 20 which, in the embodiment illustrated in the drawings, take the form of threads. As the locking member is rotated into its locking position (FIG. 3), the ribs or threads are extended beyond the outer surface of the hub body and bite into the inner surface of a roll core 14 supported upon the hub. With the threads or ribs driven into the core, the core is securely locked against independent relative rotation with respect to the spindle assembly. To release the core from the assembly, the locking members are simply turned back to their original positions (with the handle portions extending radially as shown in FIGS. 1 and 2) and the core may then be slipped off of the hubs.

In the form illustrated in FIGS. 1–3, each bore 17 is threaded for threadedly receiving a locking member 18.

Since the threads of the locking members bite into the inner surface of a core when the members are in their locking positions (with handle portions 18a extending tangentially as illustrated in FIG. 3), and since the threaded engagment between the locking members and the hub prevents longitudinal sliding movement of such members within the bores, a roll core may be held securely upon the hubs. To insure against slippage of a core during rapid acceleration or deceleration, the locking members of each set are oppositely threaded; that is, one member is provided with right-hand threads and the other with left-hand threads. Consequently, the forces which might otherwise tend to cause slipping during rapid acceleration or deceleration are effectively countered by a wedging action between the roll core, the threads 20 of a locking member, and stop flange 16.

The embodiment illustrated in FIG. 4 is substantially identical to the one already described except for the construction and mounting of the locking members 18'. Like member 18, member 18' has a locking portion which is cut or ground away at 19' and which is provided with locking ribs or threads 20'. Bore 17' is unthreaded, however, the locking member being instead held in operative relationship in the hub by enlargement 21 and locking ring 22 which retain the smooth-surfaced shank portion 23 of the member within the portion of the bore extending through flange 16'. Ring 22 may take the form of a conventioal snap ring received in a circumferential groove provided at the end of shank portion 23.

Locking member 18' also differs from the previously-described locking member to the extent that the handle portion 18a' extends radially when the member is in locking rather than unlocking position. Any tendency of the handle portion to swing outwardly under the influence of centrifugal force occasioned by high-speed operation will keep the member in locking position. It will be understood, of course, that the handle arrangement of the previously-described emodiment may also be reversed so that such portions project radially when the members are in locked positions if such a construction is found necessary or desirable.

In other respects, the embodiment of FIG. 4 is substantially identical in structure and operation to the embodiment of FIGS. 1-3. When member 18' is shifted into its locking position, the ribs or threads 20' bite into the inside surface of the roll core mounted upon the hub and wedge that core tightly against stop flange 16'. Release of the core is achieved by simply rotating handle portion 18a' into its releasing position.

It is believed apparent from the foregoing that particularly effective results are achieved by providing at least one pair of oppositely-threaded locking members. A greater number may of course be provided if so desired. Less effective but satisfactory results might also be achieved by utilizing only a single locking member as long as the hub is weighted to obtain proper balance for highspeed operation.

While in the foregoing I have disclosed an embodiment of the invention is considerable detail for purposes of illustration, it will be understood by those skilled in the art that many of these details may be varied without departing from the spirit and scope of the invention.

I claim:

1. A support for a cylindrical tubular roll core formed of resilient material comprising a generally cylindrical hub having an external diameter slightly less than the internal diameter of a tubular roll core to be fitted thereover, said hub having a longitudinally extending bore with an axis spaced inwardly from the periphery of said hub a distance less than the radius of said bore, said bore thereby being exposed longitudinally along the outer surface of said hub, and a locking member rotatably mounted in said bore, said locking member being generally cylindrical in shape but having a flattened side surface flush with the outer surface of said hub when said member is in a first releasing position, said member having its cylindrical surface provided with a plurality of ribs and being rotatable into a locking position wherein said ribs project laterally beyond the surface of said hub to engage a resilient roll core fitted thereon.

2. The structure of claim 1 wherein said ribs are arcuate and extend generally transversely with respect to said locking member.

3. The structure of claim 2 in which said ribs comprise threads extending about the cylindrical side surface of said member.

4. The structure of claim 3 in which said bore is threaded, said threads of said locking member operatively engaging the threads of said bore.

5. The structure of claim 1 in which said hub is provided with an annular flange at one end thereof to define an end stop for a roll core fitted upon said hub.

6. The structure of claim 1 in which said locking member is L-shaped in configuration, one of the portions of said L-shaped member being threadedly received in said bore and the other of said portions providing a handle for manual rotation of said member between its locking and releasing positions.

7. The structure of claim 1 in which said hub is provided with an annular flange at one end thereof, said locking member having a shank portion extending through said flange, and means provided by said locking member for restraining said locking member against axial movement with respect to said flange without preventing rotational movement of said member.

8. The structure of claim 7 in which a portion of said locking member disposed beyond said shank portion and received within said bore is threaded.

9. The structure of claim 4 in which a second bore is provided in said hub, said second bore being diametrically disposed with respect to said first-mentioned bore and threadedly receiving a second locking member, said diametrically disposed bores having the threads thereof extending the opposite directions.

10. The structure of claim 6 wherein said other of said portions of said member extends radially when said member is in its locking position.

11. The structure of claim 6 in which said other of said portions of said member extends radially when said member is in its unlocking position.

References Cited

UNITED STATES PATENTS 2,231,140   2/1941   Richardson _____ 242—68.1
2,922,592   1/1960   Kaltenbach _____ 242—68.2

NATHAN L. MINTZ, Primary Examiner